Feb. 20, 1940.     S. M. KASS     2,191,201
LOCK NUT
Filed March 1, 1938

Inventor
Samuel M. Kass

Witnesses:
Elmer W. Hacker
Walter Russel by Stoll Jackson and Son
Attorneys

Patented Feb. 20, 1940

2,191,201

UNITED STATES PATENT OFFICE 2,191,201

LOCK NUT

Samuel M. Kass, Philadelphia, Pa.

Application March 1, 1938, Serial No. 193,230

4 Claims. (Cl. 151—19)

The present invention relates to a composite nut—a safety nut for use on a standard or usual bolt or the like and adapted to lock to the bolt wherever set.

A purpose of the invention is to locate cooperating grooves upon the opposing faces respectively presented by the inner end of an internally threaded jam or clamp ring and the head of an internally and externally threaded split shank mounting the ring and radially constricted by the ring, locating the grooves of the jam or clamp ring for registry selectively with the grooves of the head to receive a pin to lock the ring from angular movement with respect to the head.

A further purpose is to secure adaptation to close angular adjustment of the lock positions of a jam or clamp ring with respect to a headed internally threaded split shank constricted by and mounting the ring.

A further purpose is to provide registry lock grooves upon the opposing faces of an internally threaded jam or clamp ring and the head of an internally and externally threaded split shank mounting and constrictd by the ring, with a plurality of uniformly angularly spaced grooves on each surface and one more groove on one surface than on the other, locating the grooves on one face to register selectively with the grooves of the opposing face, and thus dividing the angular spacing of lock positions somewhat in vernier fashion by the product of the numbers of grooves in the two faces, as adapting the grooves to present registry every 12 degrees (360÷6×5) if one face is provided with 6 and the other with 5 grooves.

A further purpose is to provide for an easy removal of a jam or clamp nut from an internally and externally threaded member carrying the jam or clamp nut.

A further purpose is to provide an internally threaded member having an internally threaded shank with a jam or clamp nut externally threading and radially constricting the shank—preferably externally threading right or left according as the threading internally is left or right respectively.

A further purpose is preferably to internally thread reversely the split and unsplit portions of an internally and externally threaded shank of a headed internal member of a composite nut, in use threading the unsplit portion of the headed member to position upon a correspondingly threaded bolt and then constricting the reverse thread of the split portion into the bolt thread by means of an external jam nut.

Further purposes will appear in the specification and in the claims.

I have elected to show one main form only of my invention, and selectnig a main form thereof that is practical and efficient in operation and which well illustrates the principles involved.

Like numerals refer to like parts in all figures.

Figure 1:
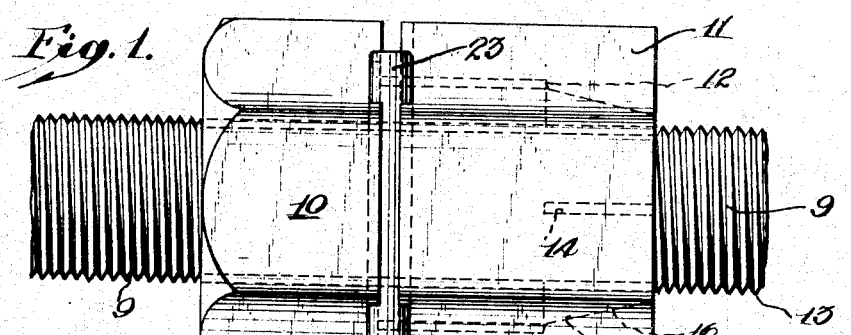
Figure 1 is a side elevation intended to illustrate conventionally structure embodying the present invention.

Describing in illustration and not in limitation and referring to the drawing:

In Figure 1 my composite safety nut for use on any bolt 9 comprises broadly a headed tubular member 10 adapted to thread on the bolt and a jam or clamp ring 11 threaded on the shank 12 of the member 10, to radially constrict the internally and externally threaded shank, clamping it inwardly upon the thread 13 of the bolt.

As shown the shank 12 is suitably split or sawcut at 14 from its outer end toward the head 15 of the member 10 and the ring and shank are respectively internally and externally coned at 16 and 17 to provide cooperating engagement surfaces between the outer clamp ring 11 and the inner nut member 10.

Preferably the members 10 and 11 are so dimensioned that the main progressive clamping constriction of the split portions of the shank upon the bolt 13 takes place after the opposing annular faces 18 and 19 of the nut and clamp members while apart are yet sufficiently near together for relatively angularly locking the members at these opposing faces when in their final clamping position—and important features of my present invention are directed to this ultimate relative locking of the members in their final clamping position.

I provide in each of the opposing faces 18 and 19 one or more key grooves 21 and 20 respectively all of the grooves 20 and 21 being at a common radial distance from the common axis 22 of the members 10 and 11—whereby each groove of one face may by proper angular adjustment of the members be selectively registered with the grooves of the other face, and cooperate with such groove to receive a removable lock pin 23, this pin removably locking the members from further relative angular movement.

Figure 5:
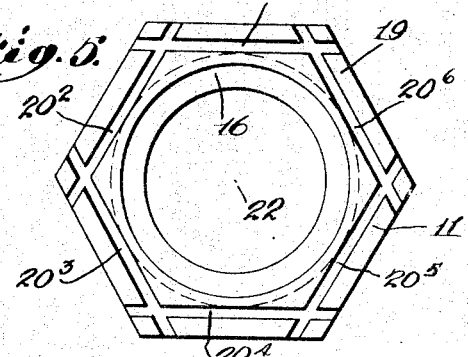
Figure 5 is a left end elevation as indicated by line 5—5 of Figure 3.
Figure 6:
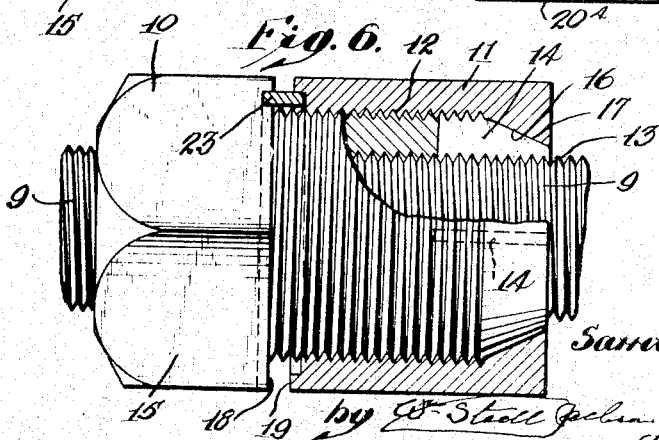
Figure 6 is a top plan view similar to Figure 1, but partially sectioned and showing a modification.

As illustrated in Figures 5 and 6 I have provided the surfaces 18 and 19 respectively with six and five grooves—20', $20_2$, $20_3$, $20_4$, $20_5$ and $20_6$ on the surface 19 and 21', $21_2$, $21_3$, $21_4$ and $21_5$ on the surface 18.

On each surface the grooves are intended to be spaced substantially uniformly about the axis 22 and by having one more groove in one face than in the other I am enabled to present six times five or thirty uniformly spaced lock positions—that is positions at which some one of the grooves on the face 18 will register with some one of the grooves on the face 19. Thus referring to Figures 5 and 6, with the parts in the grooves 20' and 21', register with one another to receive the pin 23 and by successive 12 degree angular shifts ten grooves $20_2$ and $21_2$, $20_3$ and $21_3$, $20_4$ and $21_4$ and $20_5$ and $21_5$ are successively in registry, thus providing five lock positions in a total relative angular movement of but forty-eight degrees.

Another desirable feature of my invention secures an adaptation to easily loosen the clamp ring when desired and with a single wrench rather than sometimes having to use two wrenches.

This easy loosening of the unlocked clamp ring I secure by having the thread connection between the outer clamping ring 11 and the inner nut member 10 in opposite direction to that between the nut member 10 and the bolt 9—thus in that the bolts 13 with which my safety nuts are to be used as usually with right threads requiring a corresponding right thread inside the nut member 10 I usually prefer a left thread between the clamp ring 11 and the shank 12 of the nut member 12.

In operation the composite nut member 10, with the clamp ring 11 far enough out from the head 15 of the nut member to avoid clamping, is screwed home in the usual way on the projecting end of the inserted bolt, the clamp ring 11 is then tightened, clamping the split shank sections down upon the bolt and tightened to an extent that brings some one of the lock grooves 20 of the clamp ring into registry with some one of the lock grooves 21 of the nut member 10, and the key 23 is then inserted securing the clamp ring in its set position.

Assuming right thread bolt and left thread connection between the clamp ring and nut member, it will be understood that on tightening the left threaded clamp ring there will be a tendency for the nut member to loosen but such loosening does not take place because of the combined friction at the inner engagement face 24 of the nut, and between the nut and bolt along the thread—this last friction being greatly increased by the clamping action of the clamp ring.

The need for left threading of the clamp ring upon the right threaded nut is incident to the tendency for threaded connection between the clamp ring after long standing to stick so strongly that the two members unthread from the bolt as a unit—unthreading with difficulty and leaving a unit unfit for reuse, while with reverse threads upon the bolt 13 and shank 12 such sticking is impossible—the ring loosening while nut tends to tighten—the thread clearing and the unit at once in shape for reuse.

Figure 2:
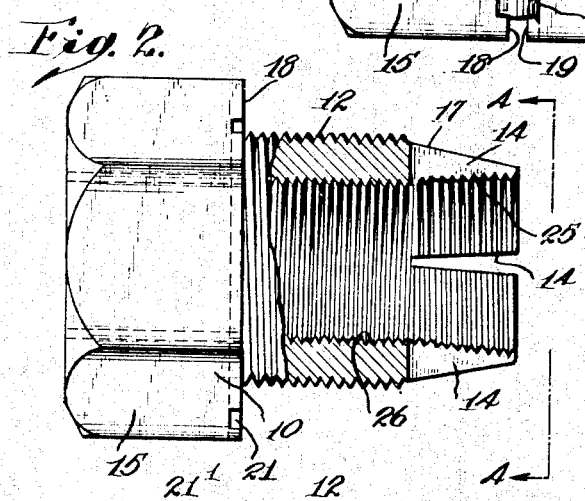
Figures 2 and 3 are respectively a partially sectioned elevation and a sectional elevation of respectively different members shown assembled in Figure 1, Figure 2 illustrating also a preferred reversed internal threading of the split and unsplit portions of a member intended to be illustrated conventionally in Figure 1 with or without this feature.
Figure 3:
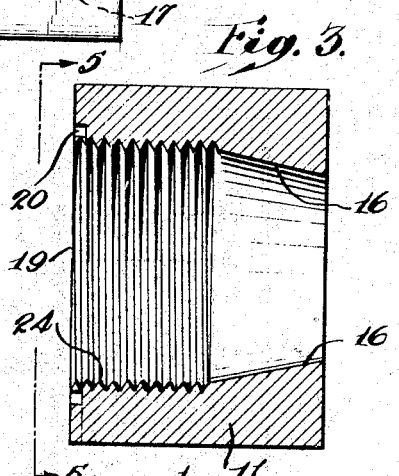
Figure 4:
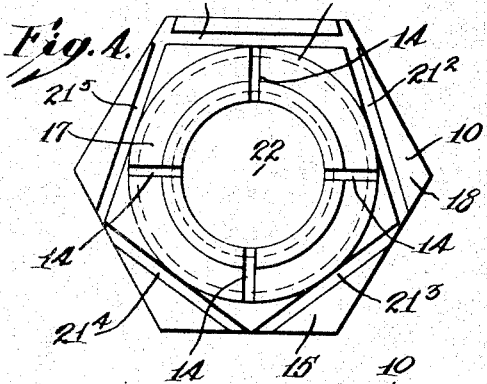
Figure 4 is a right end elevation as indicated by line 4—4 of Figure 2.

As illustrated in Figure 2 I usually prefer to internally thread the split portion of the member 10 in opposite direction to the internal threading of the unsplit body—left hand thread for example at 25 if the internal thread at 26 of the unsplit body is to be right hand—to thread upon the right hand thread of a bolt.

This opposite threading of the split and unsplit portions of the member 10 is best accomplished by tapping the right-hand thread 26 prior to saw-cutting (splitting) at 14—tapping right-hand from the shank end—then saw-cutting (splitting) at 14, and flaring the split portion, tapping right-hand from the head end of the member 10 throughout the entire length, including the left-hand threaded part of the split and flared end, insofar as this left threaded part projects into the normal path of the bolt.

When the left-hand thread of the flared end of Figure 2 is forced down against the right-hand thread of the bolt, the left threads diagonally cross the right threads of the bolt, giving a series of spaced engagements of the inwardly projecting ribs of the left thread with the outwardly projecting ribs of the right-hand thread, additionally protecting against reverse movement of the parts. Even without mutilation of the thread it is possible thus to get a concentration of pressure at the individual crossing points rather than over an entire large surface with correspondingly greater effectiveness.

The operation is as already described but the opposite threadings at 25 and 26 provide for an easier and more perfect lock between the thread of the bolt and the internal threading at 25 of the member 10.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:

1. A composite nut comprising an internally threaded body having a non-circular head and an externally threaded tubular shank therefrom tapered at the end split toward the head from its tapered end and a clamp ring threading over the split shank and adapted to engage the taper portion thereof in being screwed toward the head with a progressive radial constriction of the shank from its split end and the direction of thread between the clamp ring and shank opposite to that inside the body.

2. A composite nut comprising an internally threaded body having a non-circular head and an externally threaded tubular shank therefrom, tapered at the end and split toward the head from the tapered end and a clamp ring threading over the split shank and adapted in being screwed toward the head with a progressive radial constriction of the shank from its split end and the direction of internal thread of the body being in relatively reverse directions along the split and unsplit portions of the body, and when the clamp ring is in release the split portion of the shank flaring toward the shank end.

3. A composite nut comprising an internally threaded body having a non-circular head and an externally threaded tubular shank therefrom, tapered at the end and split toward the head from the tapered end and a clamp ring threading over the split shank and adapted in being screwed toward the head with a progressive radial constriction of the shank from its split end and the direction of internal thread of the body being in relatively reverse directions along the split and unsplit portions of the body, the thread between the clamp ring and shank reverse to that inside the unsplit portion of the body and when the clamp ring is in release the split portion of the shank flaring toward the shank end.

4. A composite nut comprising an internally threaded body having a non-circular head and an axially split tapered end, the interior of the end being flared, threaded through the flared part adjacent the body in the same direction as the internal threading of the body and threaded in the interior of the part of the flare farther from the body opposite to the threading in the interior of the body, threaded also upon the outside of the body, the threading upon the outside of the body being opposite to the direction of the threading in the interior of the body, in combination with a second nut adapted to thread upon the outside of the body and engaged to compress the split tapered portion of the first nut.

SAMUEL M. KASS.